United States Patent [19]

Eckmann

[11] Patent Number: 4,933,818
[45] Date of Patent: Jun. 12, 1990

[54] ILLUMINATED SAFETY BELT BUCKLE
[75] Inventor: Peter Eckmann, Hamburg, Fed. Rep. of Germany
[73] Assignee: Autoflug GmbH & Co. Fahrzeugtechnik, Rellingen, Fed. Rep. of Germany
[21] Appl. No.: 310,355
[22] Filed: Feb. 13, 1989
[30] Foreign Application Priority Data Feb. 13, 1988 [DE] Fed. Rep. of Germany ....... 3804628

[51] Int. Cl.⁵ .............................................. B60Q 3/00
[52] U.S. Cl. ........................................ 362/61; 362/32; 362/83.3
[58] Field of Search ................... 362/32, 61, 191, 83.3
[56] References Cited

U.S. PATENT DOCUMENTS

| 4,181,832 | 1/1980 | Ueda | 362/61 |
| 4,365,285 | 12/1982 | Brundidge | 362/191 |
| 4,580,195 | 4/1986 | Mori | 362/32 |
| 4,585,298 | 8/1986 | Mori | 362/32 |
| 4,669,817 | 6/1987 | Mori | 362/32 |
| 4,684,209 | 8/1987 | Mori | 362/32 |
| 4,717,226 | 1/1988 | Mori | 362/32 |
| 4,726,641 | 2/1988 | Mori | 362/32 |
| 4,750,797 | 6/1988 | Mori | 362/32 |
| 4,761,047 | 8/1988 | Mori | 362/32 |

Primary Examiner—Ira S. Kazarus
Assistant Examiner—Sue Hagarman
Attorney, Agent, or Firm—Robert W. Becker & Associates

[57] ABSTRACT

An illuminated safety belt buckle, especially for a motor vehicle, having a buckle housing and a key to actuate a securing device that is disposed in the housing. When an associated buckle tongue is inserted into the insertion slot formed in the housing, the securing device interlocks with the tongue. To provide illumination for the key and the insertion slot, a single light source is disposed in the buckle housing beyond these functional components. A light-conducting path of light-conducting material couples the light source with the key and the insertion slot.

12 Claims, 2 Drawing Sheets

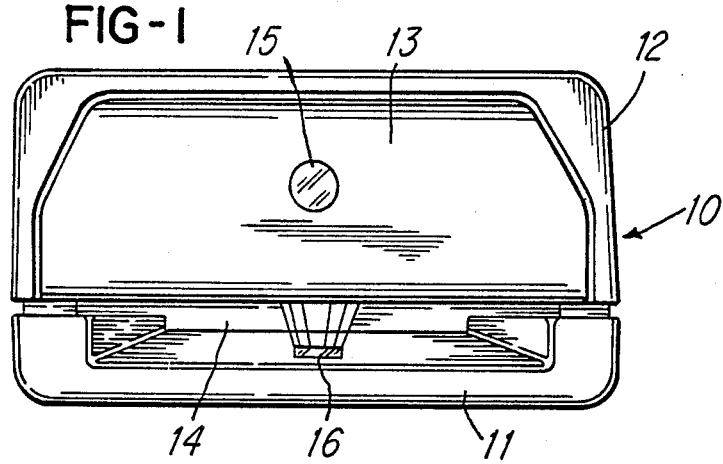
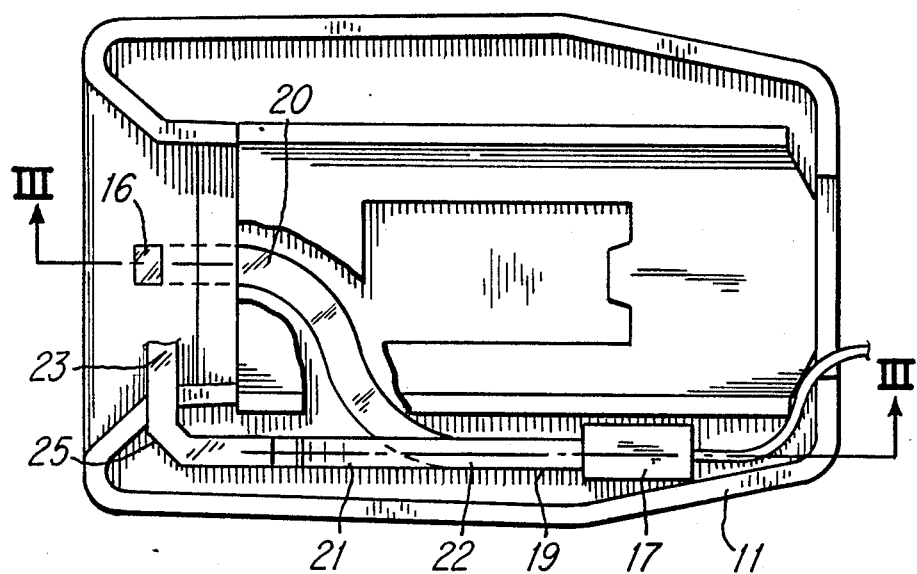

4,933,818

ILLUMINATED SAFETY BELT BUCKLE

BACKGROUND OF THE INVENTION

The present invention relates to a safety belt buckle, especially for a motor vehicle, having a buckle housing and a key to actuate a securing device that is disposed in the housing and that, when an associated buckle tongue is inserted into the insertion track or slot formed in the housing, interlocks with the tongue. A source of light is disposed in the buckle housing to provide illumination for the key and the insertion slot for the buckle tongue.

German Gebrauchsmuster No. 87 02 386 Schulz dated May 27, 1987 discloses a buckle where, to illuminate the key and the insertion slot, a source of light is disposed in the key, with this light source also radiating light into the insertion slot via an opening that is directed toward the slot. However, such a buckle illumination has the drawback that the source of light is disposed directly on the functional buckle part that is to be illuminated, as a result of which, for one thing, the key must be designed correspondingly large in order to accommodate the light source; furthermore, movable cables or leads must be placed in the buckle housing. In addition, this arrangement results in complicated mounting of the illuminating system parts in the movable key, and also makes it difficult to remove and replace the light source if it fails.

It is therefore an object of the present invention to improve the safety belt buckle of the aforementioned general type in such a way that the illuminating device operates effectively, is easier to dispose in the buckle, and is easier to install and repair.

BRIEF DESCRIPTION OF THE DRAWINGS

This object, and other objects and advantages of the present invention, will appear more clearly from the following specification in conjunction with the accompanying schematic drawings, in which:

FIG. 1 is a front view of one exemplary embodiment of the inventive safety belt buckle;

FIG. 2 is a plan view of the lower cover of the buckle of FIG. 1 showing the light-conducting path;

SUMMARY OF THE INVENTION

Figure 3:
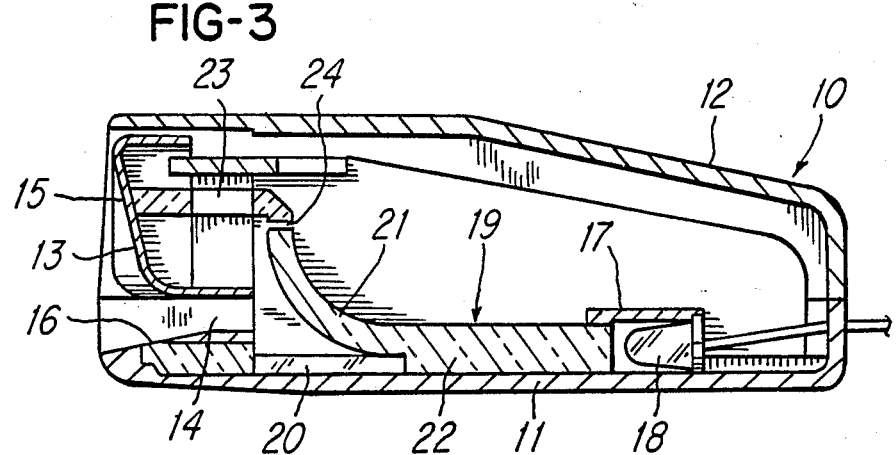
FIG. 3 is a cross-sectional view taken along the line III—III in FIG. 2.
Figure 4:
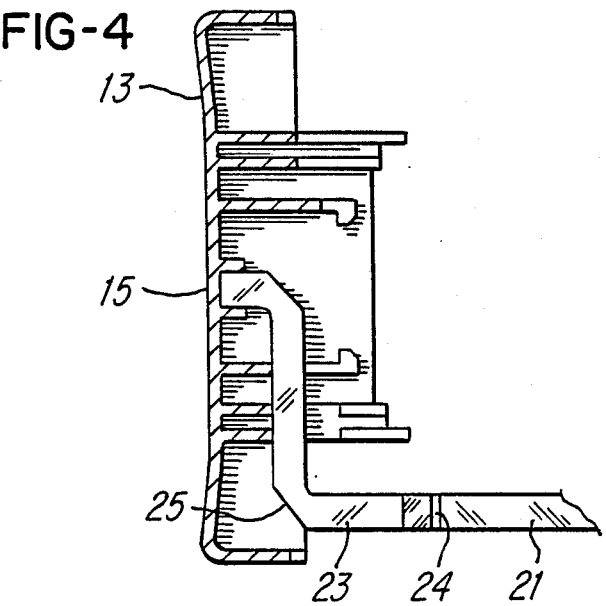
FIG. 4 is a cross-sectional view of the key of the buckle.

The illuminated safety belt buckle of the present invention is characterized primarily in that: the source of light is a single light source that is disposed in the buckle housing beyond the functional components that are to be illuminated; and a light-conducting path of highly transparent material is provided to couple the light source with the key and the insertion slot, with the light-conducting path comprising prefabricated material portions that are to be placed in the buckle housing, and with the light-conducting path having at least one branch or tap between the light source and the key on the one hand and the insertion slot on the other hand.

The present invention provides for the disposition of the light source in the buckle housing beyond the functional parts that are to be illuminated, and for the coupling of the light source with the key and the insertion slot via a light-conducting path of light-conducting material. This light-conducting path includes material portions of highly transparent material, preferably acrylic glass, that are arranged in conformity with the spacial conditions of the belt buckle housing that is to be illuminated; with this light-conducting path, the effect of the inner total reflection utilizes the light-conducting capacity to transfer light. By means of the associated material portions, the light stream that is emitted from a central light source that serves several functional components, can be split up via taps and can also be distributed in the buckle housing via angled portions and air gaps of the light-conducting path. Angling or bending the light stream is effected via reflection on appropriate reflector surfaces or by maintaining certain radii. In order to keep losses due to reflection to a minimum, the surfaces should be polished in the regions where the light-conducting path is bent or transferred.

The present invention has the advantage that it is merely necessary to accommodate one light source at any desired location in a decentralized manner in the buckle housing; the light source can be disposed in the housing in any desired manner. Each of the individual material portions, as light conductors, are securely connected to the buckle housing and themselves undertake no movements. Thus, the light conductors are not subjected to and mechanical stress, can be easily installed, and represent no risk for the buckle functions inasmuch as no additional loose or movable parts are present in the buckle. To the extent that movable buckle parts are to be coupled with stationary parts in the vicinity of the light-conducting path, this is effected via transfer locations where the associated portions of the light-conducting path face one another without contacting each other, so that a quasi-static light-conducting system results. Movable cables or leads are completely eliminated.

By appropriate visual preparation of the respective outlet opening of the light-conducting path, it is possible to produce varying illumination forms on, for example, the actuation field of the key. With convex or planar ends, points of light result, whereas with a concave configuration, illuminated surfaces result on the key. Similarly, it is possible to have the light-conducting path end in several outlet openings in the vicinity of the insertion slot in order in this manner to be able to illuminate the entire insertion zone.

Further specific features of the present invention will be described in detail subsequently.

DESCRIPTION OF PREFERRED EMBODIMENTS

Referring now to the drawings in detail, the safety belt buckle comprises a buckle housing 10 with a bottom cover 11 and a top cover 12. The buckle body disposed in the interior of the housing together with its functional components with regard to locking the similarly not-illustrated buckle tongue does not form part of the present invention and to this extent is also not illustrated. In the illustrated embodiment, the key for actuating the lock mechanism is embodied in the buckle housing 10 as the sliding key 13. The buckle housing 10 is furthermore provided with a funnel-like insertion slot 14 for the buckle tongue.

As can be seen from FIG. 1, in this embodiment the sliding key 13 is illuminated by a point of light 15, and the insertion slot 14 is illuminated by a light outlet 16.

As can be seen in greater detail in FIGS. 2 and 3, a light diode 18 as a central source of light for the illumination of the buckle is disposed on a lamp holder 17 on the lower cover 11 in the buckle housing 10; a bulb could also be used in place of a light diode. The connection between the source of light 18 and the point of light 15 or light outlet 16 is effected via a light-conducting path 19 that is composed of a plurality of material or supply portions 20, 21, and 23. A branch or tap 22 is disposed in the light-conducting path 19 in order to convey the central light stream to the functional components 13, 14, which are spaced apart from one another. The material or supply portion 20 leads to the light outlet 16 of the insertion slot 14 and the portion 21, coupled with the portion 23 which is movable relative to the portion 21, leads to the point of light 15 of the key 13.

The further portion 23 is disposed in the key 13, which is displaceable within the housing 10. Coupling of the portion 23 to the portion 21 is effected at a transfer location 24 at which in the rest position of the key 13, the portions 23 and 21 face one another without contacting each other. Nonetheless, flow of light between the source of light 18 and the point of light 15 is assured. Although this light-conducting path is interrupted by displacement of the key 13, at that moment illumination of the key is not needed.

To the extent that in the vicinity of the key 13 a bending or angling 25 of the portion 23 is necessary, care is taken that this bent or angled portion 25 is provided with a reflector surface, which is formed by polishing the surface, in order to keep the transmitted light clustered in the region of the bent or angled portion 25. It is possible to have further deviations from a linear path of the light-conducting path, accompanied by the preservation of the prescribed radii, via correspondingly polished surfaces.

In conformity with the configuration of the buckle housing 10, not only the source of light 18 but also the individual portions 20, 21, 23 of the light-conducting path 19 can be disposed in any desired manner without adversely affecting the accommodation of the functional buckle body. Other functional components of the buckle can also be associated with appropriately disposed light-conducting path portions of the source of light.

The present invention is, of course, in no way restricted to the specific disclosure of the specification and drawings, but also encompasses any modifications within the scope of the appended claims.

What I claim is:

1. In an illuminated safety belt buckle having a guasi-static light-conducting system with which movable cables and leads are completely eliminated, especially for a motor vehicle, having a buckle housing and a sliding key to actuate a securing device that is disposed in said housing to one side thereof and that, when an associated buckle tongue is inserted into a funnel-like insertion slot that is formed in the housing to the other side thereof, interlocks with said tongue, with a source of light being disposed in said buckle housing to provide illumination for said sliding key and said funnel-like insertion slot for said buckle tongue, including the improvement therewith wherein:

said source of light is a single light source that is disposed directly longitudinally to one side in said buckle housing beyond said sliding key and said funnel-like insertion slot as functional components that are to be illuminated by said single light source in particular; and a light-conducting path of highly transparent material is provided to couple said light source with said sliding key and said funnel-like insertion slot, with said light-conducting path comprising prefabricated material portions that are to be placed in said buckle housing, and with said light-conducting path having at least one tap that branches off between said light source and said sliding key on the one side and said funnel-like insertion slot on the other side.

2. A safety belt buckle according to claim 1, in which interposed in said light-conducting path is at least one transfer location where said material portions are disposed next to one another without contacting each other.

3. A safety belt buckle according to claim 2, which includes a transfer location between a material portion that is disposed on said key and a portion of said light-conducting path that is disposed in said buckle housing.

4. A safety belt buckle according to claim 1, in which said light-conducting path deviates from a linear path, with the involved material portions being embodied with a minimum radius for clustered deflection of a light beam.

5. A safety belt buckle according to claim 4, in which surfaces of said material portions in the vicinity of said radii are polished.

6. A safety belt buckle according to claim 1, in which said light-conducting path deviates from a linear path, with bent portions of said material portions being provided with reflector surfaces designed for clustered deflection of a light beam.

7. A safety belt buckle according to claim 6, in which surfaces of said material portions in the vicinity of said bent portions are polished.

8. A safety belt buckle according to claim 1, in which said common light source for illuminating said key and insertion slot is provided with portions that lead to these parts.

9. A safety belt buckle according to claim 1, which includes only two functional components that are connected specifically to said light source.

10. A safety belt buckle according to claim 1, in which said material of said light-conducting path is acrylic glass.

11. A safety belt buckle according to claim 1, in which said light source is a light diode.

12. A safety belt buckle according to claim 1, in which said light source is a bulb.

* * * * *